United States Patent [19]

Steffier

[11] Patent Number: 5,455,106
[45] Date of Patent: Oct. 3, 1995

[54] MULTILAYER FIBER COATING COMPRISING ALTERNATE FUGITIVE CARBON AND CERAMIC COATING MATERIAL FOR TOUGHENED CERAMIC COMPOSITE MATERIALS

[75] Inventor: Wayne S. Steffier, Huntington Beach, Calif.

[73] Assignee: Hyper-Therm High Temperature Composites, Inc., Hunington Beach, Calif.

[21] Appl. No.: 132,524

[22] Filed: Oct. 6, 1993

[51] Int. Cl.$^6$ ............... D03D 3/00; D02G 3/00; C04B 35/02; C04B 35/08
[52] U.S. Cl. ............. 428/229; 428/251; 428/288; 428/294; 428/378; 428/902; 501/94; 501/95; 501/99
[58] Field of Search ............. 428/294, 902, 428/245, 229, 251, 288, 378; 501/94, 95, 99

[56] References Cited

U.S. PATENT DOCUMENTS

| | | |
|---|---|---|
| 4,397,901 | 8/1983 | Warren . |
| 4,580,524 | 4/1986 | Lackey, Jr. et al. . |
| 4,605,588 | 8/1986 | Simpson et al. . |
| 4,642,271 | 2/1987 | Rice . |
| 4,722,524 | 9/1988 | Coblenz . |
| 4,748,079 | 5/1993 | Thebault . |
| 4,752,503 | 6/1988 | Thebault . |
| 4,837,230 | 6/1989 | Chen et al. . |
| 4,869,943 | 9/1989 | Corbin et al. . |
| 4,885,199 | 12/1989 | Corbin et al. . |
| 4,933,309 | 5/1988 | Luthra . |
| 4,935,387 | 6/1990 | Beall et al. . |
| 4,948,758 | 8/1990 | Beall et al. . |
| 5,026,604 | 6/1991 | Thebault . |
| 5,079,039 | 1/1992 | Heraud et al. . |
| 5,164,341 | 11/1992 | Chyung et al. . |

*Primary Examiner*—James D. Withers
*Attorney, Agent, or Firm*—Coudert Brothers

[57] ABSTRACT

A fiber-reinforced ceramic-matrix composite material exhibiting high tensile strength, high fracture toughness and high-temperature oxidation resistance is produced by alternatively depositing multiple thin layers of ceramic material separated by very thin intermediate layers of fugitive carbon onto the fiber reinforcement prior to the subsequent densification with the ceramic matrix. The energy behind propagating matrix cracks in the resulting composite material are effectively dissipated by the progressive increase in crack deflection/branching and frictional slip through the successive ceramic layers of the multilayer fiber coating system. These energy release and arrest mechanisms sufficiently impede the driving force behind unstable crack propagation and render the cracks non-critical, thereby serving to blunt and/or divert propagating matrix cracks at or around the reinforcing fiber. While significantly increasing the strength and fracture toughness of the composite, the multilayer refractory fiber coating system enables the composite to remain oxidatively stable when stressed at or beyond the matrix cracking stress point and subsequently exposed to temperatures above 800° C. in air.

6 Claims, No Drawings

MULTILAYER FIBER COATING COMPRISING ALTERNATE FUGITIVE CARBON AND CERAMIC COATING MATERIAL FOR TOUGHENED CERAMIC COMPOSITE MATERIALS

FIELD OF THE INVENTION

The present invention relates to a toughened, oxidation resistant ceramic composite material composed of a refractory fiber reinforcement, a multilayer refractory fiber coating system which protects the reinforcing fibers from advancing matrix cracks, and a ceramic matrix.

BACKGROUND OF THE INVENTION

In general, ceramics have superior high-temperature strength and modulus, lower density, and lower thermal conductivity than metallic materials. The principal disadvantages of ceramics as structural materials are their relatively low failure strain, low fracture toughness and catastrophic brittle failure characteristics. Because of these intrinsic limitations, monolithic ceramics lack the properties of reliability and durability that are necessary for structural design acceptance. However, by incorporating high strength, relatively high modulus fibers into brittle ceramic matrices, high strength/high toughness composites can be obtained. Successfully tailored ceramic-matrix composites exhibit highly non-linear stress-strain behavior with ultimate strengths, failure strains and fracture toughnesses substantially greater than that of the unreinforced matrix.

It is well known that in order to exploit the benefits of fiber-reinforced ceramic-matrix composites, a relatively weak fiber/matrix interfacial bond strength is necessary to prevent catastrophic failure from propagating matrix cracks. The interface must provide sufficient fiber/matrix bonding for effective load transfer, but must be weak enough to debond and slip in the wake of matrix cracking while leaving the fibers to bridge the cracks and support the far-field applied load. Currently available fiber coatings such as carbon and boron nitride have demonstrated the desired mechanical characteristics necessary to enhance the composite strength and toughness, however the utility of these composites are severely limited by their susceptibility to oxidation embrittlement and strength degradation when stressed at or beyond the matrix cracking stress point and subsequently exposed to high-temperature oxidation. This fundamental limitation is due to the accelerated environmental degradation of the fiber coating at elevated temperatures in air following the onset of matrix cracking.

The following patents disclose ceramic composites which suffer from the foregoing limitations: U.S. Pat. No. 4,397,901 to Warren discloses a ceramic coating on a ceramic fiber to accommodate a thermal expansion mismatch. U.S. Pat. No. 4,935,387 and U.S. Pat. No. 4,948,758, both to Beall et al., disclose a sheet silicate coating on the fibers which promotes fiber pull-out by cleavage failures between crystal sheets. U.S. Pat. No. 4,869,943 and U.S. Pat. No. 4,885,199, both to Corbin et al., disclose toughening a ceramic matrix with a fiber coating such as pyrolytic carbon or other material which differs either in morphology or chemistry from the fiber and the matrix, thereby providing a crack deflection zone. U.S. Pat. No. 4,772,524 to Coblenz discloses a fibrous monolith, not a fiber/matrix composite, in which the planes of weakness between adjacent fibers deflect advancing cracks in the monolith. U.S. Pat. No. 4,642,271 to Rice and U.S. Pat. No. 4,605,588 to Simpson et al., both disclose a boron nitride coating on ceramic fibers. Rice discloses that the coated fibers are in a matrix and the fiber coating promotes fiber pull-out. U.S. Pat. No. 4,752,503 and U.S. Pat. No. 5,026,604, both to Beall disclose a laminar pyrolytic carbon and boron nitride fiber coating having a thickness between 0.2 and 3 microns and a greater failure elongation than the matrix for increased impact strength.

SUMMARY OF THE INVENTION

The object of the present invention is to mitigate the fundamental limitations of current carbon and boron nitride fiber coatings through the use of a multilayer refractory fiber coating system. The multilayer refractory fiber coating system is intrinsically oxidation resistant at elevated temperatures and is tailored in such a way as to provide the necessary mechanical characteristics to enhance the strength and toughness of the resulting ceramic-matrix composite. According to the invention, the fiber coating is produced by alternatively depositing a single or multiple thin layer(s) of ceramic material separated by very thin intermediate layers of fugitive carbon onto the fiber reinforcement texture prior to the subsequent densification with the ceramic matrix.

In the present invention, a process is described for the manufacture of a toughened, oxidation resistant ceramic composite material composed of a refractory fiber reinforcement, a multilayer refractory fiber coating system, and a ceramic matrix.

Refractory fibers are defined as any fibers, continuous or discontinuous, which are capable of withstanding a temperature of at least 800° C. in an atmosphere which is thermochemically compatible with that fiber without suffering fundamental chemical, physical or mechanical degradation-for example, carbon fibers, silicon carbide fibers, aluminum oxide fibers, etc.

Multilayer fiber coating system is defined as any refractory composition of metal carbide, nitride, boride, silicide, or oxide which is deposited (for example by chemical vapor deposition) onto the refractory fibers in such a way as to produce multiple alternating layers of the ceramic material separated by very thin intermediate layers of fugitive carbon deposited (for example by chemical vapor deposition) in succession. The resulting fiber coating system is composed of a single or multiple thin, concentric and radially noncontiguous layer(s) of ceramic material chemically interrupted and atomically separated by very thin concentric layers of fugitive carbon which fully encapsulate the reinforcing fibers.

Fugitive carbon is defined as a very thin layer of carbon deposited between adjacent ceramic layers of the multilayer fiber coating system and between the final ceramic layer of the multilayer fiber coating system and the ceramic matrix, the purpose of which is to prevent the chemical bonding between the adjacent ceramic layer(s) or the ceramic matrix during the deposition process. Because the concentric fugitive carbon layers are maintained very thin relative to the ceramic layer(s), they may be volatilized by high-temperature oxidation prior to use or in-situ without degrading the thermomechanical performance of the finished composite.

Ceramic matrix is defined as any refractory composition of metal carbide, nitride, boride, silicide, or oxide which is subsequently deposited (for example by chemical vapor deposition) onto the previously coated refractory fibers thereby encapsulating and densifying the refractory fiber preform.

Chemical vapor deposition (CVD) is defined as the process in which a solid ceramic or carbon material is deposited at elevated temperature and typically reduced pressure from gaseous and/or vaporized liquid precursors.

Fiber preform is defined as a fibrous reinforcing texture produced by weaving, braiding, fiber placement, winding, felting, or other textile process.

DETAILED DESCRIPTION OF THE INVENTION

By methods of CVD, the multilayer fiber coating system is produced by alternatively depositing a single or multiple thin concentric layer(s) of ceramic material, such as silicon carbide or other refractory metal carbide, nitride, boride, silicide, or oxide, separated by very thin intermediate and concentric layers of fugitive carbon to prevent bonding and chemical interaction of adjacent ceramic layers onto the fiber reinforcement texture prior to the subsequent densification with the ceramic matrix.

The lack of strong bonding between adjacent, noncontiguous layers of ceramic in the multilayer fiber coating system provide fracture impeding mechanisms which prevent unstable co-planar matrix crack propagation. Each disbonded ceramic/ceramic interface provides sufficient frictional resistance for load transfer between the fiber and matrix, but is weak enough to slip during the matrix crack propagation process. The fracture energy behind propagating matrix cracks in the resulting composite material are thus effectively dissipated by the progressive increase in crack deflection/branching and frictional slip through the successive ceramic layers of the multilayer coating, thereby serving to blunt and/or divert propagating matrix cracks at or around the reinforcing fiber. The more interfaces encountered by a propagating matrix crack, the more tortuous the crack path becomes, thus absorbing the fracture energy at an increasing rate. While significantly increasing the strength and toughness of the composite, the multilayer refractory fiber coating system enables the composite to remain oxidatively stable when stressed at or beyond the matrix cracking stress point and subsequently exposed to temperatures above 800° C. in air.

According to the process of the present invention, a reinforcing preform is first produced by weaving, braiding, fiber placement, winding, or other textile process using refractory fibers such as carbon, silicon carbide, aluminum oxide, or other fiber capable of withstanding temperatures of at least 800° C. The dry fiber preform is then fixtured and compacted in a holding tool so as to maintain the desired fiber volume fraction by controlling the preform thickness prior to subsequent composite processing.

The initial processing step is the application of a 50–500 angstrom layer of fugitive carbon coating on the fixtured fiber preform to protect the fibers from potentially detrimental chemical interaction with the subsequent ceramic coating and/or ceramic coating process chemistries during deposition. The CVD-applied carbon chemical barrier coating is produced by the pyrolytic decomposition of a hydrocarbon gas such as methane ($CH_4$) at elevated temperature and reduced pressure.

The second processing step is the application of a 0.5–5.0 micron layer of ceramic coating, such as silicon carbide or other refractory metal carbide, nitride, boride, silicide, or oxide by known methods of CVD. The third processing step is the application of a second fugitive carbon layer produced as described in the initial CVD processing step to prevent chemical bonding of the subsequent ceramic coating layer or, in the case of a fiber coating system composed of only a single ceramic layer, the ceramic matrix. For multilayer refractory fiber coating systems composed of more than one concentric ceramic layer, the forth processing step is the application of the second ceramic layer. The thickness of the second and subsequent ceramic layers in the multilayer fiber coating system can be of the same thickness or slightly thicker (sequentially graded thickness) than the previously deposited ceramic layer(s). Any number of ceramic layers in the multilayer coating system can be used, however, from the standpoint of composite strength and toughness, it is more beneficial to use a greater number of thin ceramic layers than fewer relatively thick ceramic layers in the multilayer coating system. Again, each deposited ceramic layer is chemically interupted by a very thin intermediate layer of fugitive carbon prior to the application of the subsequent ceramic layer.

The final multilayer fiber coating processing step prior to matrix densification is the application of a 50–500 angstrom close-out layer of fugitive carbon to prevent chemical bonding with the ceramic matrix while maintaining the identity of the multilayer fiber coating system.

The coated fiber preform, still fixtured in a tool, is then infiltrated and consolidated with a suitable ceramic matrix obtained by CVD. During the densification process, the fiber preform remains fixtured until an initial level of ceramic matrix is deposited to adequately rigidize or harden the preform. Following the matrix rigidization process, the hardened preform is removed from the holding tool and further densified in the free standing state until the desired bulk density of the composite is obtained. The result is a toughened ceramic composite material composed of a refractory fiber reinforcement, an oxidation resistant multilayer refractory fiber coating system which protects the reinforcement from advancing matrix fractures propagating directly through the fibers, and a ceramic matrix.

EXAMPLES 1–3

A reinforcing preform was fabricated by stacking 8 plies of 8-harness satin woven silicon carbide (SiC) fabric (ceramic-grade Nicalon® produced by Nippon Carbon Co., Ltd., Japan and marketed in the United States by Dow Corning Corp., Midland, Mich.) in a cross-ply $(0/90)_{2s}$ orientation. The laminated preform was then fixtured and compacted in a graphite holding tool so as to maintain a fiber volume fraction of nominally 35–40% by controlling the preform thickness prior to subsequent composite processing. The initial processing step was the application of a 100–200 angstrom layer of fugitive pyrolytic carbon (PyC) coating on the fixtured preform to protect the Nicalon® fibers from known thermochemical degradation during subsequent SiC CVD processing. The CVD-applied PyC chemical barrier coating was produced by the pyrolytic decomposition of $CH_4$ at a temperature of 1050° C. and a total pressure of 15 Torr. The second processing step was the application of the initial 1.0 micron layer of SiC produced by the thermal decomposition of vaporized methyltrichlorosilane (MTS) using hydrogen as a carrier gas in the CVD reactor at a temperature of 1000° C. and a total pressure of 5 Torr. The first two CVD processing steps were repeated three additional times so as to produce four discrete 1.0 micron layers of SiC separated and chemically disbonded by four 100–200 angstrom layers of fugitive PyC. Sequentially following the application of the four initial 1.0 micron layers of SiC, four additional 2.0 micron layers of SiC were applied, again with each ceramic layer discretely separated by intermediate layers of fugitive PyC to prevent bonding of the adjacent SiC layers. Four final 3.0 micron layers of SiC were applied, each followed by a 100–200 angstrom layer of fugitive PyC. The resulting multilayer refractory fiber coating system consisted of twelve concentric and radially noncontiguous layers of SiC, sequentially graded in thickness incrementally every four layers, and thirteen very thin intermediate, uniform thickness concentric layers of fugitive PyC.

Following the application of the multilayer fiber coating system, the laminated preform was infiltrated and consolidated with a SiC matrix produced by CVD to a bulk density of 2.5 gm/cm$^3$. The corresponding residual porosity in the completed ceramic composite was about 12%. The resulting material was a SiC composite material consisting of an 8-ply woven Nicalon® SiC fabric reinforcement, an engineered multilayer SiC fiber coating system, and a SiC matrix. Mechanical test specimens were machined from the densified composite panel and further processed with a final SiC CVD application to mitigate any microstructural damage incurred by machining. The average bulk density of the completed ceramic composite test specimens after the final CVD application was 2.54 gm/cm$^3$.

Uniaxial tensile tests were performed to establish the mechanical characteristics of the composite material system at room-temperature (Example 1), following isothermal conditioning at 1000° C. in air for 24 hours (Example 2), and following pre-cracking the specimens at a tensile stress of approximately twice that of the matrix cracking stress and subjecting the specimens to an exposure at 1000° C. in air for 24 hours (Example 3). Table 1 summarizes the results of this evaluation for Examples 1–3 specimens of toughened fiber-reinforced ceramic-matrix composite material of the present invention. A comparison between the results obtained on Example 1 specimens and the Examples 2 and 3 specimens illustrate that the multilayer SiC fiber coating system of the present invention not only imparts high strength and high strain-to-failure to the composite, but remains oxidatively stable when subjected to temperatures of 1000° C. in air for 24 hours and when stressed well beyond the matrix cracking stress point and subsequently exposed to temperatures of 1000° C. in air for 24 hours.

TABLE 1

Tensile Properties* of Nicalon ® SiC Fiber-Reinforced SiC Matrix Composites Incorporating an Oxidation Resistant Multilayer SiC Fiber Coating System

| Tensile Property | Units | Environmental Conditioning | | |
| --- | --- | --- | --- | --- |
| | | Room-Temperature | Post-Isothermal[1] | Stress-Oxidation[2] |
| Pre-Cracking Stress | Mpa | — | — | 118.8 (2.5) |
| Matrix Cracking Strength | MPa | 63.4 (2.6) | 84.8 (1.1) | — |
| Ultimate Strength | MPa | 216.1 (8.2) | 255.6 (3.7) | 180.2 (22.3) |
| Failure Strain | % | 0.42 (0.16) | 0.68 (0.07) | 0.37 (0.15) |
| Initial Elastic Modulus | GPa | 261.6 (38.9) | 254.2 (23.6) | 206.2 (32.8) |
| Poisson's Ratio | — | 0.19 (0.07) | — | — |
| Number of Tests | — | 5 | 5 | 5 |

*Average Value (Standard Deviation)
[1]1000° C. in air for 24 hours
[2]Pre-Cracked in Tension and Exposed to 1000° C. in air for 24 hours

What is claimed is:

1. A ceramic composite material comprising a ceramic matrix reinforced with a preform of coated refractory fibers having at least the following coatings:

a first coating of fugitive carbon having a thickness of 50–500 angstroms, a second coating of a ceramic material having a thickness of 0.5–5.0 microns, and a third coating of fugitive carbon having a thickness of 50–500 angstroms.

2. The product of claim 1, wherein the refractory fibers are either continuous or discontinuous carbon, silicon carbide, aluminum oxide, or other fibers capable of withstanding temperatures in excess of 800° C.

3. The product of claim 1, wherein the preform is produced by weaving, braiding, fiber placement, winding or felting the refractory fibers.

4. The product of claim 1, wherein the structure of the coating consists of more than one 0.5–5.0 micron coating of ceramic material, sequentially separated by at least one 50–500 angstrom coatings of fugitive carbon to prevent bonding between adjacent ceramic coatings and the ceramic matrix of which fully encapsulates the refractory fibers.

5. The product of claim 1, wherein the ceramic material in the second coating and the ceramic matrix is selected from the group consisting of silicon carbide, tantalum carbide, hafnium carbide, boron carbide, zirconium carbide, silicon nitride, titanium nitride, tantalum nitride, hafnium nitride, boron nitride, zirconium nitride, silicon boride, titanium boride, hafnium boride, zirconium boride, boron silicide, titanium silicide, zirconium silicide, molybdenum silicide, aluminum oxide, silicon oxide, tantalum oxide, hafnium oxide, boron oxide, zirconium oxide and mixtures thereof.

6. The product of claim 1, wherein the ceramic material in the second coating and the ceramic matrix is silicon carbide.

* * * * *